(12) United States Patent
Kolodziej et al.

(10) Patent No.: US 11,626,966 B2
(45) Date of Patent: Apr. 11, 2023

(54) METHODS AND APPARATUS FOR ANALOG CANCELER TUNING USING NEURAL NETWORKS

(71) Applicant: Massachusetts Institute of Technology, Cambridge, MA (US)

(72) Inventors: Kenneth E. Kolodziej, Lexington, MA (US); Aidan U. Cookson, Rowley, MA (US); Bradley Thomas Perry, Nashua, NH (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 17/109,634

(22) Filed: Dec. 2, 2020

(65) Prior Publication Data

US 2023/0081695 A1    Mar. 16, 2023

Related U.S. Application Data

(60) Provisional application No. 62/943,719, filed on Dec. 4, 2019.

(51) Int. Cl.
*H04L 5/14*     (2006.01)
*G06N 3/04*     (2006.01)
*H04B 17/345*   (2015.01)

(52) U.S. Cl.
CPC ............. *H04L 5/1461* (2013.01); *G06N 3/04* (2013.01); *H04B 17/345* (2015.01)

(58) Field of Classification Search
CPC ..... H04L 5/1461; H04B 17/345; H04B 1/123; H04B 1/525; H04B 3/23; G06N 3/04
See application file for complete search history.

(56) References Cited

U.S. PATENT DOCUMENTS

| 7,155,179 | B1 | 12/2006 | Rothenberg |
| 7,783,266 | B2 | 8/2010 | Hosokawa et al. |
| 9,203,455 | B2 | 12/2015 | Yang et al. |
| 9,859,992 | B1* | 1/2018 | Hogerheiden ......... H04B 1/525 |
| 9,887,862 | B2 | 2/2018 | Zhou et al. |
| 9,900,019 | B1* | 2/2018 | Chang ................ H03M 1/1009 |

(Continued)

FOREIGN PATENT DOCUMENTS

WO    WO 2018/218089 A1    11/2018

OTHER PUBLICATIONS

PCT International Search Report and Written Opinion dated May 21, 2021 for International Application No. PCT/US2021/019918; 13 Pages.

(Continued)

*Primary Examiner* — Chandrahas B Patel
(74) *Attorney, Agent, or Firm* — Daly, Crowley, Mofford & Durkee, LLP

(57) ABSTRACT

A network device includes a transceiver configured to concurrently transmit signals and receive signals within a single frequency band resulting in radio-frequency signal interference. The device includes an analog canceler configured to mitigate the signal interference. The device includes a neural network that receives data that describes characteristics of the signal interference and provides coefficients for the analog canceler as outputs. The neural network-generated coefficients are applied to the analog canceler which uses them to cancel the signal interference.

24 Claims, 7 Drawing Sheets

(56) References Cited

U.S. PATENT DOCUMENTS

| | | | |
|---|---|---|---|
| 9,909,904 B2* | 3/2018 | Geiger | G01M 3/38 |
| 10,110,306 B2 | 10/2018 | Jain et al. | |
| 10,243,718 B2 | 3/2019 | Hong et al. | |
| 10,256,864 B2 | 4/2019 | Eltawil et al. | |
| 10,374,656 B2 | 8/2019 | Cox et al. | |
| 10,601,456 B2* | 3/2020 | Tsui | H04B 17/11 |
| 11,165,463 B1* | 11/2021 | Williams | H04B 10/2575 |
| 11,245,430 B1 | 2/2022 | Huang | |
| 2007/0173209 A1 | 7/2007 | Kim et al. | |
| 2007/0237270 A1 | 10/2007 | Mezer et al. | |
| 2016/0248610 A1 | 8/2016 | Vaman et al. | |
| 2017/0214429 A1 | 7/2017 | Eistein et al. | |
| 2018/0278290 A1 | 9/2018 | Moorti et al. | |
| 2019/0173503 A1 | 6/2019 | Kolodziej et al. | |
| 2019/0253922 A1 | 8/2019 | Jain et al. | |
| 2019/0327070 A1 | 10/2019 | Jung et al. | |
| 2020/0043461 A1 | 2/2020 | Zollner et al. | |

OTHER PUBLICATIONS

Non Final Office Action dated Mar. 24, 2022, U.S. Appl. No. 17/185,142, 28 pages.

U.S. Appl. No. 17/185,142, filed Feb. 25, 2021, Yi, et al.

U.S. Appl. No. 17/186,894, filed Feb. 26, 2021, Kolodziej.

PCT Notification of Transmittal of the International Search Report and the Written Opinion of the International Searching Authority, International Search Report and Written Opinion, dated Feb. 19, 2021, for International Application No. PCT/US2020/62823; 10 Pages.

Bai, et al.; "Full-Duplex in 5G Small Cell Access: System Design and Performance Aspects"; Mar. 23, 2019; 7 Pages.

Bakshi, et al.; "Fast and Efficient Cross Band Channel Prediction Using Machine Learning"; 25th Annual International Conference on Mobile Computing and Networking; Article No. 37; Oct. 2019; 16 Pages.

Balachandran, et al.; "Flexible Duplex in FDD Spectrum"; ICC 2017: WS07-Workshop on Flexible Networks (FlexNets); Jan. 2017; 6 Pages.

Beach, et al.; "Flexible Duplex Transceivers for 5G and Beyond Wireless Access"; URSI AT-RASC 2015 Conference; Jan. 2015; 1 Page.

Bharadia, et al.; "Full Duplex Radios"; SIGCOMM'13; Jan. 2013; 12 Pages.

Cummings, et al.; "Neural Networks for Real-Time Adaptive Beamforming in Simultaneous Transmit and Receive Digital Phased Arrays"; Jan. 2019; 8 Pages.

Guo, et al.; "DSIC: Deep Learning based Self-Interference Cancellation for In-Band Full Duplex Wireless"; Jan. 2019; 6 Pages.

Guo, et al.; "Realtime Software Defined Self-Interference Cancelation Based on Machine Learning for In-Band Full Duplex Wireless Communication"; 2018 International Conference on Computing, Networking and Communications (ICNC): Mobile Computing and Vehicle Communications; pp. 779-783; Jan. 2018; 5 Pages.

Hagan, et al.; "Training Feedforward Networks with the Marquardt Algorithm"; IEE Transactions on Neural Networks; vol. 5; No. 6; pp. 989-993; Nov. 1994; 5 Pages.

Huusari, et al.: "Wideband Self-Adaptive RF Cancellation Circuit for Full-Duplex Radio: Operating Principle and Measurements"; Jan. 2015; 7 Pages.

Jain, et al.; "Practical, Real-time, Full Duplex Wireless"; Proceedings of the 17th Annual International Conference on Mobile Computing and Networking, MOBICOM 2011; Sep. 19-23, 2011; 12 Pages.

Kim, et al.; "Demo: A Reinforcement Learning-based Flexible Duplex System for B5G with Sub-6 GHz"; Jan. 2020; 2 Pages.

Kolodziej, et al.; "Adaptive Learning Rate Turning Algorithm for RF self-Interference Cancellation"; IEEE Transactions on Microwave Theory and Techniques; Jan. 2020; 12 Pages.

Kolodziej, et al.; "In-Band Full-Duplex Technology: Techniques and Systems Survey"; IEEE Transactions on Microwave Theory and Techniques; vol. 67; No. 7; pp. 3025-3041; Jul. 2019; 17 Pages.

Kolodziej, et al.; "Multitap RF Canceller for In-Band Full-Duplex Wireless Communication"; IEEE Transactions on Wireless Communications; vol. 15; No. 6; pp. 4321-4334; Jun. 2016; 14 Pages.

Kolodziej, et al.; "Photonic-Enabled RF Canceller for Wideband In-Band Full Duplex Wireless Systems"; IEEE Transactions on Microwave Theory and Techniques; vol. 67; No. 5; May 2019; 11 Pages.

Kolodziej, et al.; "Wideband Vector Modulator for RF Cancellers in STAR Systems"; RWS 2018; pp. 64-67; Jan. 2018; 4 Pages.

Kurzo, et al.; "Design and Implementation of a Neural Network Aided Self-Interference Cancellation Scheme for Full-Duplex Radios"; Asilomar 2018; pp. 589-593; Jan. 2018; 5 Pages.

Kurzo, et al.; "Hardware Implementation of Neural Self-Interference Cancellation"; IEEE Journal on Emerging and Selected Topics in Circuits and Systems; vol. 10; No. 2; p. 204-216; Jun. 2020; 13 Pages.

Levenberg; "A Method for the Solution of Certain Non-Linear Problems in Least Squares"; vol. II; No. 2; pp. 164-168; Feb. 21, 1944; 5 Pages.

Liao; "Dynamic Uplink/Downlink Resource Management in Flexible Duplex-Enabled Wireless Networks"; ICC2017: WT02-3rd International Workshop on 5G RAN Design; Jan. 2017; 7 Pages.

Liu; "On the Levenberg-Marquardt Training Method for Feed-Forward Neural Networks"; 2010 Sixth International Conference on Natural Computation (ICNC 2010); pp. 456-460; Jan. 2010; 5 Pages.

Marquardt; "An Algorithm for Least-Squares Estimation of Nonlinear Parameters"; J. Soc. Indust. Appl. Math.; vol. 11; No. 2; Jun. 1963; 11 Pages.

Nagulu, et al.; "Fully-Integrated Non-Magnetic 180nm SOI Circulator with >1W P1dB, >+50dBm IIP3 and High Isolation Across 1.85 VSWR"; 2018 IEEE Radio Frequency Integrated Circuits Symposium; pp. 10-107; Jan. 2018; 4 Pages.

Nagulu, et al.; "Non-Magnetic 60GHz SOI CMOS Circulator Based on Loss/Dispersion-Engineered Switched Bandpass Filters"; ISSCC 2019; Session 28; Techniques for Low-Power & High-Performance Wireless; 28.5; pp. 446-448; 2019 IEEE International Solid-State Circuits Conference; Jan. 2019; 3 Pages.

Ozis, et al.; "Integrated Quadrature Couplers and Their Application in Image-Reject Receivers"; IEEE Journal of Solid-State Circuits; vol. 44; No. 5; May 2009; 13 Pages.

Palaniappan, et al.; "A Spectral Shaper Based Two-Tap RF Self-Interference Canceller for Full-Duplex Radios"; IEEE/MIT-S International Microwave Symposium; pp. 614-617; Jan. 2019; 4 Pages.

Pirinen; "Challenges and Possibilities for Flexible Duplexing in 5G Networks"; Special Session: Duplexing Techniques for 5G Networks; pp. 6-10; Jan. 2015; 5 Pages.

Reiskarimian, et al.; "A CMOS Passive LPTV Nonmagnetic Circulator and Its Application in a Full-Duplex Receiver"; IEEE Journal of Solid-State Circuits; vol. 52; No. 5; May 2017; 15 Pages.

Smith, et al.; "Neural Network Training With Levenberg-Marquardt and Adaptable Weight Compression"; IEEE Transactions on Neural Networks and Learning Systems; vol. 30; No. 2; pp. 580-587; Feb. 2019; 8 Pages.

Balatsoukas-Stimming; Non-Linear Digital Self-Interference Cancellation for In-Band Full-Duplex Radios Using Neural Networks; 2018 IEEE 19th International Workshop on Signal Processing Advances in Wireless Communications (SPAWC); Jan. 2018; 5 Pages.

Tamminen, et al.; "Digitally-Controlled RF Self-Interference Canceller for Full-Duplex Radios"; 2016 24th European Signal Processing Conference (EUSIPCO); pp. 783-787; Jan. 2016; 5 Pages.

Wan, et al.; "Evolving LTE with Flexible Duplex"; Globecom 2013 Workshop—Emerging Technologies for LTE-Advanced and Beyond 4G; pp. 49-54; Jan. 2013; 6 Pages.

Wang, et al.; "Performance Comparison of Real and Complex Valued Neural Networks for Digital Self-Interference Cancellation"; 2019 IEEE 19th International Conference on Communication Technology; pp. 1193-1199; Jan. 2019; 7 Pages.

Zhan, et al.; "Full Duplex 2X2 MIMO Radios"; 2014 Sixth International Conference on Wireless Communications and Signal Processing (WCSP); Jan. 2019; 6 Pages.

(56) References Cited

OTHER PUBLICATIONS

Zhan, et al.; "Full Duplex Dual-Band Radio Dedicated to Flexible Radio Communications"; Research Report N° 8558; Jul. 2014, 17 Pages.
Search Report and Written Opinion dated Feb. 19, 2021 for International Application No. PCT/US2020/062823; 11 Pages.
U.S. Final Office Action dated Sep. 29, 2022 for U.S. Appl. No. 17/185,142; 21 pages.
Response to U.S. Office Action dated Sep. 29, 2022 for U.S. Appl. No. 17/185,142; Response filed on Dec. 23, 2022; 13 pages.
Request for Continued Examination (RCE) for U.S. Appl. No. 17/185,142; filed Dec. 23, 2022; 3 pages.
U.S. Notice of Allowance dated Dec. 12, 2022 for U.S. Appl. No. 17/186,894; 8 pages.

* cited by examiner

METHODS AND APPARATUS FOR ANALOG CANCELER TUNING USING NEURAL NETWORKS

RELATED APPLICATIONS

This patent claims the benefit of U.S. Provisional Patent Application No. 62/943,719 filed Dec. 4, 2019, which application is hereby incorporated herein by reference in its entirety.

FEDERALLY SPONSORED RESEARCH

This invention was made with government support under FA8702-15-D-0001 awarded by the U.S. Air Force. The government has certain rights in the invention.

FIELD

This disclosure relates to cancelation of signal interference between electronic or electromagnetic signals.

BACKGROUND

Time division and frequency division multiplexing and duplexing are different architecture types that can be used for signal transmission and reception. For example, current fifth generation (5G) new radio (NR) and sixth generation (6G) wireless systems require the use of both frequency-division duplex (FDD) and time-division duplex (TDD) modes, as well as flexible duplexing. The latter concept was initiated to evolve fourth generation (4G) Long-Term Evolution (LTE) systems by merging aspects of FDD and TDD to enhance network efficiency. This, however, can result in closely spaced frequency channels being assigned to concurrently occurring transmit and receive operations, which generates system-level interference. This interference has previously been managed through power control algorithms and device muting.

In-Band Full-Duplex (IBFD) systems operate in full-duplex mode, where a signal is transmitted and received on the same frequency at the same time. This scheme requires a high amount of isolation between the co-located transmitter and receiver in order to avoid self-interference (SI). SI occurs as a result of a system transmit signal leaking or otherwise being received in a receive signal path (e.g. a receive channel) of the same system. Minimizing the amount of transmit signal power coupled into the receiver helps avoid saturating the receiver and allows the reception of weak signals from remote users. Self-interference is typically reduced (and ideally minimized) by using multiple layers of cancelation, one of which is adaptive RF cancelation. In current applications such as 5G, signal interference must be sufficiently suppressed quickly and in real-time. Although cancelers have been shown to successfully mitigate SI in other systems, current RF cancelers lack the tuning speed required for such applications.

To solve this issue, some cancelers utilize special channel-probing waveforms and receive signal strength indicator information (RSSI) for tuning. Others employ dithered linear search (DLS) approaches and least mean squares (LMS) algorithms. While these RF cancelers provided sufficient cancelation performance, they are not able to converge to their optimal settings in an efficient manner, which causes errors and inefficiencies in the transmission and reception for these systems.

SUMMARY

In embodiments, the tuning time of an analog, RF canceler can be improved by using a neural network (or other type of machine learning algorithm) to perform the tuning. For example, a neural network can be implemented to generate canceler coefficients based on network traffic that it receives from the network. By using a trained neural network to provide coefficients to the canceler, the tuning time of the canceler can be drastically reduced.

As described below, in various embodiments described herein, neural networks are used to characterize and learn self-interference in a transmission network. The neural network then uses network traffic from the transmission network to generate coefficients (e.g. weighting coefficients) used by the analog canceler (e.g. an RF canceler or an IF canceler). After training the network on practical cancelation sequences, the resulting tuning function can make predictions that configure the canceler to its optimal settings or close to its optimal settings. This approach can increase the canceler tuning speed by up to or more than 25 times the speed of other tuning algorithms. This speed enhancement can allow an analog canceler to be used in IBFD systems and, for example, to be incorporated into the 5G wireless network using the flexible duplex mode that is currently built into the specification.

In addition, generating training data for the neural network by recording and measuring signal interference in a transmission network can greatly increase the efficiency of the neural network and allow the neural network to tune the analog canceler even more efficiently. The training data can be generated using a test network or using the actual network in which the canceler will operate and can include signal interference measurements generated from test transmission patterns or from real-world transmission data. In the case of a wireless network, additional training data can be generated that provides signal interference measurements in various environments in which the wireless network may operate. All of these data can contribute to reduced time for the neural network to tune the canceler.

In an embodiment, a system includes a transceiver configured to concurrently transmit signals and receive signals within a single frequency band resulting in signal interference (SI). An analog canceler is configured to mitigate the SI between the transmitted signals and the received signals, and a neural network is configured to generate a series of coefficients for use by the analog canceler. The neural network comprises an input to receive data representing one or more parameters that describe one or more characteristics of the SI, and an output comprising a series of coefficients which, when applied to the analog canceler, enables the analog canceler to cancel the signal interference between the signals transmitted and received by the antenna system.

One or more of the following features may be included.

The transceiver may include an antenna system. The antenna system may be configured to transmit and receive the signals on a fifth generation (5G) or sixth generation (6G) network.

The one or more characteristics may include one or more of: a magnitude of the SI, a phase of the SI, a real portion of the SI, an imaginary portion of the SI, a quadrature signal of the SI, a bandwidth of the SI, an error vector of the SI, a frequency of the SI, an average of a signal measurement of the SI over a specific bandwidth of the SI, or a combination thereof The system may be an in-band full-duplex system and may include a mobile device or base station that includes the transceiver, analog canceler, and neural network.

The analog canceler may have a plurality of taps and the series of coefficients may comprise a weighting vector for each tap.

The neural network may be trained with measured data representing signal interference. The measured data may be generated by measuring signal interference in a second system configured to concurrently transmit signals and receive signals within a single frequency band.

In another embodiment, a method for communicating on a network includes concurrently transmitting and receiving, via a transceiver, signals within a single frequency band resulting in signal interference (SI), receiving, by a neural network, data representing one or more parameters that describe one or more characteristics of the SI; generating, by the neural network, an output comprising a series of coefficients configured to cancel the signal interference; providing the series of coefficients to an analog canceler; and using the series of coefficients from the neural network, by the analog canceler, to cancel the signal interference.

One or more of the following features may be included.

The one or more characteristics may include one or more of: a magnitude of the SI, a phase of the SI, a real portion of the SI, an imaginary portion of the SI, a quadrature signal of the SI, a bandwidth of the SI, a frequency of the SI, an error vector of the SI, an average of a signal measurement of the SI over a specific bandwidth of the SI, or a combination thereof The analog canceler may generate a canceling signal based on the series of coefficients which, when mixed with the signals received by the transceiver, reduces or eliminates the signal interference.

The canceling signal may be combined or mixed with the signals received by the transceiver to reduce or eliminate the signal interference.

The transceiver, analog canceler, and neural network may be parts of a mobile device.

Concurrently transmitting and receiving the signal may include transmitting and receiving the signals on a fifth generation (5G) or sixth generation (6G) network.

The analog canceler may have a plurality of taps and the series of coefficients may include a weighting vector for each tap.

The neural network may be trained with training data representing the signal interference. The training data may be generated by measuring the signal interference in a second network.

In another embodiment, a method for communicating on a network includes generating signal interference (SI) by transmitting and receiving signals within a single frequency band in a network, generating training data by measuring one or more characteristics of the signal interference, training a neural network with the training data, communicating on a network by transmitting and receiving signals within a single frequency band in a second network, generating, by the neural network, one or more coefficients for an analog canceler based on the training data and the signals transmitted and received in the second network, and using, by an analog canceler, the one or more coefficients to cancel signal interference in the second network.

One or more of the following features may be included.
The first network may be a test network.
The first and second networks may be the same network.
The first network may be a real-world network.

The signal interference may be generated in one or more real-world environments.

The one or more characteristics may include one or more of: a magnitude of the SI, a phase of the SI, a real portion of the SI, an imaginary portion of the SI, a quadrature signal of the SI, a bandwidth of the SI, an error vector of the SI, a frequency of the SI, an average of a signal measurement of the SI over a specific bandwidth of the SI, or a combination thereof.

BRIEF DESCRIPTION OF THE DRAWINGS

The features described here may be more fully understood from the following drawings. The drawings aid in explaining and understanding the disclosed technology. Since it is often impractical or impossible to illustrate and describe every possible embodiment, the provided figures depict one or more exemplary embodiments. Similarly, any flow diagrams are provided as examples only and may be changed, reordered, reduced, expanded, etc. and remain within the scope of this disclosure. Accordingly, the figures are not intended to limit the scope of the invention. Like numbers in the figures denote like elements.

DETAILED DESCRIPTION

Overview

Figure 1:
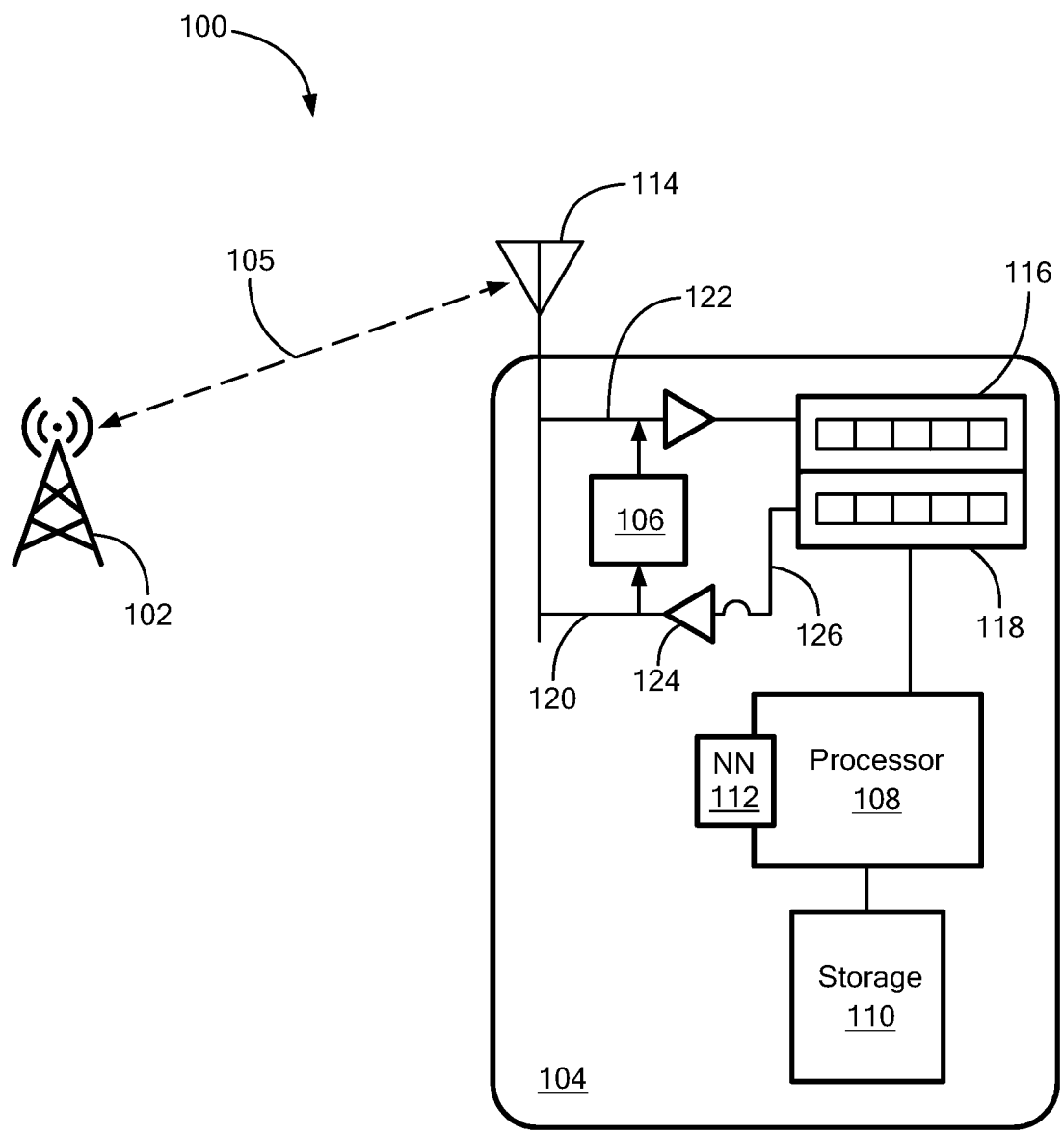
FIG. 1 is a block diagram of a transmission network including an analog canceler and neural network.

Referring to FIG. 1, an example network 100 includes a base station 102 and mobile device 104 in communication through a wireless link 105. Network 100 may be an in-band full-duplex (IBFD), also known as a same-frequency simultaneous transmit and receive (STAR) system, where a base station 102 and/or mobile device 104 each transmit and receive data (i.e. messages) on the same frequency band at the same time. For example, messages sent by base station 102 may be sent in the same frequency band at the same time as messages received by the base station 102. Likewise, messages sent by the mobile device 104 may be sent in the same frequency band at the same time as messages received by the mobile device 104.

Network 100 may be any type of communication network that utilizes in-band full-duplex transmission. Although depicted as a wireless communication network in FIG. 1, network 100 could also by a satellite network, a radar network, a wired network, etc. One skilled in the art will recognize that the systems and methods described here can be used, or can be adapted to be used, with any type of network including those that employ in-band full-duplex technologies.

In FIG. 1, for ease of illustration, the details of mobile device 104 are shown to illustrate and discuss the technology. However, the systems and methods described in this patent can be included as part of base station 102, of mobile transceivers, or of any device utilizing in-band full-duplex transmission or otherwise subject to signal interference between transmitter and receiver channels. For example, wireless networks have been designed to cover large areas with static access points and symmetric communications that utilized spectrally inefficient frequency division duplexing for channel access. The trend has been towards deploying significantly smaller cells that utilize time-division duplexing to support asymmetric data traffic for user equipment, such as large file downloads and high-definition video streaming applications that are common on mobile devices. The systems and methods described in this patent are suitable for use in any device operating in any such network.

Mobile device 104 may include an antenna system 114 comprising one or more antennas (e.g. a bistatic or monostatic antenna system) for transmission and reception of messages over the wireless link 105. In some embodiments, the antenna system 114 is a single antenna that is used for both transmission and reception of signals.

In this case, mobile device 104 may include a circulator (e.g. a three-port device) which couples the antenna to transmit and receive systems (e.g. a transceiver) of mobile device 104. As is known, in embodiments utilizing a circulator, the circulator is disposed between the antenna port and the transmitter and receiver ports to direct transmission signals (e.g. signals generated by a transmitter) to the antenna, and direct signals received by the antenna to a receiver.

In other embodiments, the antenna system 114 may include two or more antennas (e.g. separate receive and transmit antennas). In embodiments a receive antenna system may comprise one or more antennas and a transmit antenna system may comprise one or more antennas). In this case, although a system may use separate transmit and receive antennas, the antennas may be located close enough together (e.g. physically located in the same device or on the same antenna tower) so that the receive antenna(s) receive transmissions (e.g. RF signals) being emitted via the transmit antenna.

To reduce errors caused by the signal interference, mobile device 104 includes an analog canceler 106. The canceler 106 is disposed to couple portions of transmit signals (e.g. outgoing transmissions) from a transmit signal path (here via transmission line 120) and, in response, drive an analog cancelation signal into a receive signal path (here via receiver path or line 122). The analog cancelation signal is configured to cancel interference signals (e.g. transmission signals) from the transmit signal path (e.g. from transmission line 120) that are coupled into the receive signal path (e.g. onto the receiver line 122), so that the signal remaining on receiver line 122 is the actual signal received by the antenna 114 from another transmission device such as base station 102.

As shown, the analog canceler 106 is coupled to the analog transmission line 120. In other embodiments, the analog canceler 106 may receive a digital transmission signal as input. For example, the analog canceler 106 may be coupled to receive the digital transmission signal 126 from the transmission buffer 118, prior to the digital transmission signal 126 being converted to an analog signal by the digital-to-analog converter 124.

Additionally, the analog canceler 106 may be coupled to the transmission signal line 120 after the transmission signal is amplified, which allows the analog canceler 106 to capture and cancel any noise or nonlinear distortions in the signal interference. Additionally, the output of the analog canceler 106 can be coupled to receiver line 122 before the signal is fed into an amplifier, which can help minimize receiver saturation and nonlinearities.

To generate the cancelation signal, the analog canceler 106 receives a series of coefficients. These coefficients define or shape the cancelation signal. For example, the coefficients may define a phase and magnitude of the cancelation signal that shapes the cancelation signal so that, when mixed with the receiver signal, it cancels the signal interference caused by the transmission line 120.

Mobile device 104 also includes a neural network 112 to generate the coefficients that are used by analog canceler 106. The neural network 112 may be a feed forward neural network, a convolutional neural network, a radial basis neural network, a deep neural network, a recurrent neural network, or any other type of neural network that can be adapted to generate coefficients for use by the analog canceler 106.

A processor 108 is configured to effectuate the neural network 112. The processor 108 includes a memory and may be coupled to volatile or non-volatile storage 110. The memory and/or storage hold software instructions that cause the processor to run the neural network 112. The software instructions may also cause the processor to run the network functions of mobile device 104 such as sending data to transmission buffer 118 or receiving data from receive buffer 116. In general, processor 108 may be programmed to perform some or all the functions described in this patent. In embodiments, processor 108 may be a single processor that performs the functions or may comprise multiple processors each programmed to perform one or some of the functions.

Figure 2:
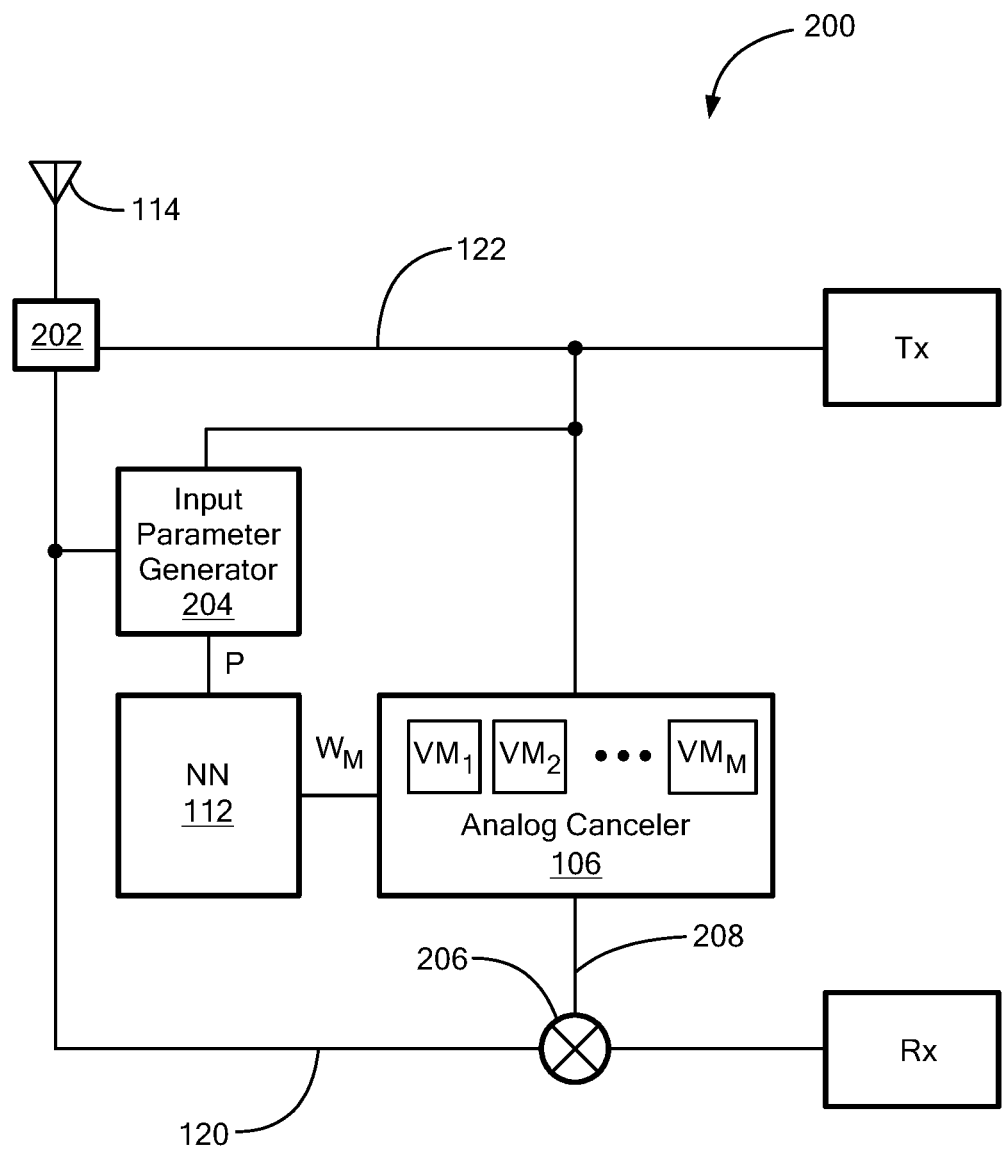
FIG. 2 is a block diagram of a transceiver including an analog canceler and neural network.

Referring to FIG. 2, a transceiver circuit 200 is shown. The transceiver may be incorporated into base station 102, mobile device 104, or any other device operating in IBFD mode and/or in an IBDF environment.

The transceiver circuit 200 includes an antenna system 114 coupled via a transmit signal path (e.g. an analog transmission line) 122 to a transmitted Tx. Antenna system 114 is also coupled via a receive signal path (e.g. analog receiver line) 120 as described above. In the case where antenna system 114 is a single antenna, a circulator 202 may be included to direct signals to/from the antenna to the transmitter Tx and receiver Rx as is generally known (e.g. to route transmit signals from the transmitter TX via transmission line 122 to the antenna 114 and to route receive signals from the antenna to the receiver Rx via receiver line 120.

The transceiver circuit 200 also includes an analog canceler 106 and a neural network 112, also described above. The analog canceler 106 may be coupled to receive transmission signals from transmission line 122 and generate a cancelation signal 208. The cancelation signal 208 may be added onto the receiver line 120 by a coupler 206 to cancel the signal interference before the signals are digitized by an analog to digital processor and subsequently processed. In other embodiments, the cancelation signal 208 may be combined onto the receiver line 120 by any other signal combination techniques such as mixing, combining, or the like.

The analog canceler 106 may include multiple vector modulator taps $VM_n$ and the neural network 112 may produce a series of tap vectors $w_n$ that are received by the analog canceler 106. The tap vectors may include data such as weighted coefficients, amplitude and phase information, and the like that is used by the taps $VM_n$ during signal interference cancelation. Although the taps in this example are vector modulator taps, one skilled in the art will recognize that other types of taps may be used.

The neural network 112 is coupled to receive input parameters P that describe the signal interference, the signals on the transmission line 122, or both. In embodiments, a signal parameter generator circuit 204 is coupled to the transmission line 122 and/or receiver line 120 to measure the signals on the transmission line (and/or receiver line) and produce the input parameters P. The input parameter generator circuit 204 may be a traditional circuit, a signal processing circuit, another neural network, or any circuit or algorithm that can measure characteristics of the transmission signals.

In some instances, the mobile device 104 may include sensors that can measure the input parameters P. For example, cellular phones, base stations, and/or other devices configured to communicate over the network 105 may have sensors or fixtures to measure the quality of messages that are transmitted and received over the network. These quality measurements can be used as some or all of the input parameters P that are fed into the neural network 112. Additionally, or alternatively, the input parameters P can be measured and captured using text equipment, auxiliary receiver channels, or any other device that can measure transmission parameters on a transmission or receiver line.

These characteristics (and thus, the input parameters P) may include measurements such as, but not limited to: a magnitude of the SI, a phase of the SI, a real portion of the SI, an imaginary portion of the SI, a quadrature signal of the SI, a bandwidth of the SI, an error vector of the SI, an average of a signal measurement of the SI over a specific bandwidth of the SI, or a combination thereof In other embodiments, the input parameters P may include information about the transmission signal itself as transmitted on the transmission line 122. Such information may include, but is not limited to one or more of: a phase of the signal, a real portion of the signal, an imaginary portion of the signal, a frequency of the signal, a magnitude of the signal, an average measurement of the signal, transmit output power, signal bandwidth, frequency channel allocation and/or hopping list, receive signal strength indicator, receiver automatic gain setting or attenuation, receiver mask profile, adjacent channel power level, desired receiver sensitivity, and the like.

In embodiments, the neural network 112 has plurality of layers N and utilizes a sigmoid architecture with sigmoid activation functions at every node of the layers. In embodiments, the last network layer contains a linear function that scales the final outputs to the appropriate ranges for the specific analog canceler 106 hardware. If the analog canceler 106 has two taps, the output vectors w from the neural network 112 may each include four values, i.e. a weighting value $w_I$ and $w_Q$ for each tap.

Within the neural network 112, each node may be connected in a forward-propagating fashion. Also, each node's input may be assigned some weighting value so that new inputs can propagate through the network to produce relevant outputs. The neuron activation functions are inspired by their practical counterparts in biological neural networks, and thus can effectuate either linear or nonlinear equations that determine the node's output response based on its inputs. Linear functions can scale the input by a constant value c, and are often used in the last network layer, L, to scale the outputs to a desired range. Nonlinear activation functions, on the other hand, give the network the ability to provide multi-dimensional mapping with a minimal number of network nodes. One example of a nonlinear equation utilized within neural networks is the logistic-sigmoid function:

$$f(z) = \frac{1}{1+e^{-z}} \quad (1)$$

which has a smooth gradient that prevents large output changes for small input variations and provides a natural normalization since the outputs are bounded between 0 and 1.

The signal interference may be comprised of direct path SI as well as dynamic SI that is dependent on the surroundings, and has a composite impulse response that can be modeled as:

$$h_i(t) = \alpha_0 \delta(t - \tau_0) + \sum_{k=1}^{K} \alpha_k \delta(t - \tau_k) \quad (2)$$

where the first term represents the direct path coupling and the second term captures the dynamic signal interference. The first term may be dictated by the specific antenna structure of the antenna system 114, such that $\alpha_0$ captures the attenuation coefficient of the signal that is delayed by $\tau_0$ and convolved with a phase shift response, $h_{\phi 0}$ (t). The second term may be dictated by K multipath reflections from the environment around the IBFD.

The analog canceler 106 suppresses the signal interference $h_i(t)$ by coupling some or all of the transmit signal from the transmission line 122 and shaping it (e.g. altering the phase, delay, and amplitude) to match the signal interference signal $h_i(t)$. In one example, the analog canceler 106 generates a cancelation signal such as:

$$h_c(t) = \sum_{m=1}^{M} w_{I,m} \delta(t - \tau_{I,m}) + j w_{Q,m} \delta(t - \tau_{Q,m}) \quad (3)$$

In this instance, the analog canceler 106 may be a multitap IQ canceler with M taps, where $w_I$ and $w_Q$ are the tunable tap weights for I– and Q– vectors, and $\tau_I$ and $\tau_Q$ are the corresponding tap delays. In some embodiments, the tap delays may also be tunable. The analog canceler 106 may have two or more taps to address the multiple components of the signal interference, as shown in equation (1). Thus, in this example, the neural network 112 may produce as its output sequence of coefficient vectors $w_M$ to be used by the analog canceler 106, each vector including tap weights $w_I$ and $w_Q$ and/or delay times $\tau_I$ and $\tau_Q$.

The architecture and functions associated with the neural network 112 are described above are for the purposes of example only. In other embodiments, the neural network 112 may comprise any workable architecture and functions that can receive parameters P and generate coefficients for use by an analog canceler to cancel signal interference.

Figure 3:
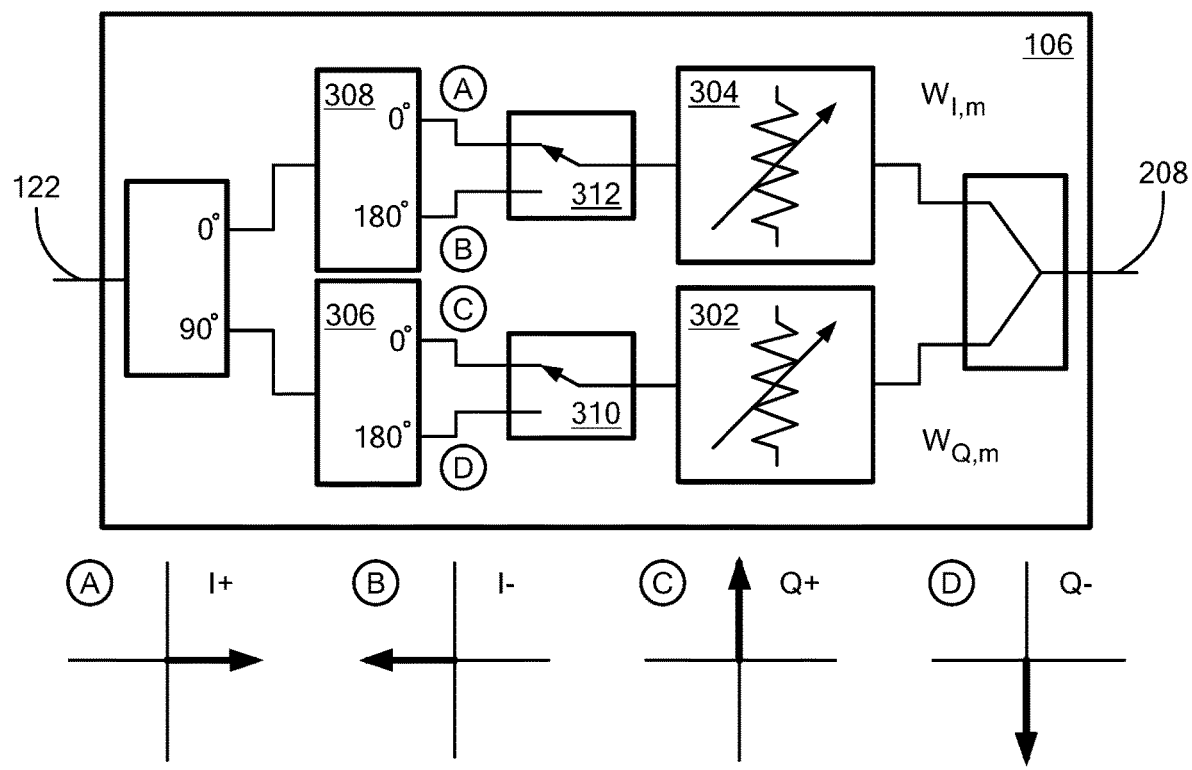
FIG. 3 is a block diagram of an analog canceler.

FIG. 3 is a block diagram of an embodiment of the analog canceler 106. In this example, the analog canceler 106 has two vector modulator (VM) taps to mitigate signal interference. As shown in equation (2), in this example the signal interference comprises both direct path SI as well as dynamic SI that is dependent on the surroundings, and has a composite impulse response Since the signal interference (e.g. as represented in equations (2) and (3)) contains delays that are dependent on both the antenna and surrounding environment, the analog canceler 106 may be configured to provide similar delays to counteract these signals. This is accomplished, for example, using multiple canceler taps that internally delay the transmit signal for the various SI paths. Furthermore, these taps can dynamically change their attenuation and phase to compensate for the unknown SI response characteristics that are specific to a location.

Each tap may include an attenuator circuit 302, 304 responsive to weight coefficients $W_{I,m}$ and $W_{Q,m}$ which, as noted above, may be generated by the neural network 112. Each tap may also include a delay circuit. The delay circuits have been omitted from FIG. 3 for clarity. However, the delay circuits may be fixed delay circuits or tunable delay circuits that are responsive to delay coefficients generated by the neural network 112, as described above.

In this example, each tap may also include a phase shifter or inverter circuit 306, 308 and a switch 310, 312 to create four vectors I+, I−, Q+, Q−. The switches 310, 312 may select either the positive or the negative vector for both the in-phase (I) and quadrature (Q) channels before they are attenuated by the attenuator circuits 302, 304. The combination of this vector selection and weighting allows the VM to generate arbitrary attenuation and phase changes of the input signal based on the coefficient vectors w provided by the neural network 112. In other embodiments, other circuits may be used in addition to or in place the phase shifters and/or inverters. For example, a circuit that individually weights the four outputs of the 180-degree hybrids, and then combines them using a 4-way combiner, could be used.

Analog Canceller Tuning

A challenge of tuning any adaptive analog canceler is that the magnitude and phase of the SI varies over time. This is a result of changes in either the assigned frequency band or the dynamic multipath environment around the wireless node. When a change is detected by the receiver (typically when a characteristic of the signal integrity rises above a given threshold), the analog canceler must adapt the weights for each tap to compensate and suppress the SI. This involves finding the optimal weights $W_I$ and $W_Q$ for each tap, which, when using traditional techniques can be a time-consuming process.

Figure 4:
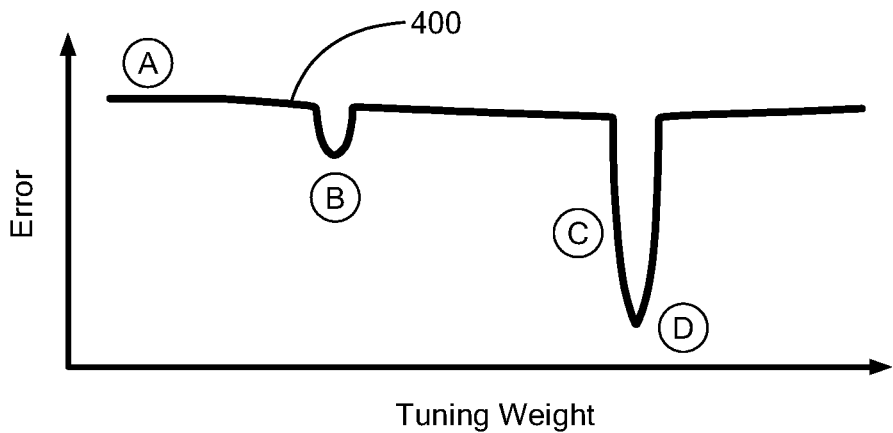
FIG. 4 is a plot of signal interference error versus analog canceler tuning weight.

Referring to FIG. 4, when considering the errors for all the possible canceler weight configurations, a multi-dimensional error surface can be generated. The resulting cancelation-error surfaces are non-convex and present nearly flat gradients, local minima and precise optimal locations, all of which can be demanding on adaptive tuning algorithms, potentially limiting their performance and effectively increasing their tuning time.

Graph 400 is one which represents a two-dimensional slice of a surface for a single tuning weight. Using traditional methods, when the analog canceler 106 is enabled for an unknown signal interference channel, it selects initial weight settings that are non-optimal (such as point A). An adaptive tuning algorithm must then accelerate its learning rate to avoid local minima (such as point B) before reducing its step size when interesting features (such as point C) are encountered before finally locating the global minimum (such as point D). This tuning can be accomplished using adaptive algorithms that learn from the error surface and provide canceler weight updates. While traditional algorithms can traverse non-convex error surfaces and achieve convergence, they still requires many tuning iterations that consume significant portions of a time symbol, thus rendering it insufficient for flexible duplex operation which may be required in networks such as 5G wireless networks.

Figure 5:
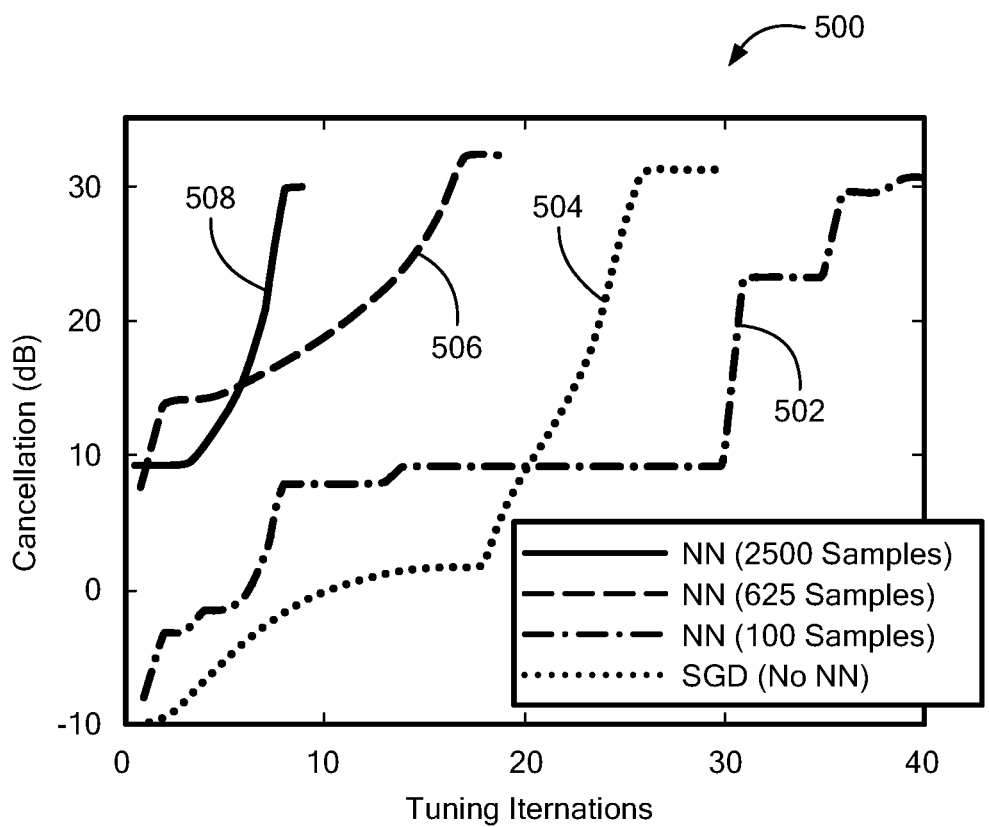
FIG. 5 is a plot of signal interference cancelation versus tuning iterations for various neural network training sequences.

Referring to FIG. 5, the canceler tuning can be accelerated using machine learning, and more specifically, a neural network such as neural network 112. In graph 500 the vertical axis represents cancelation decibels, which is a measurement of the analog canceler's 106 effectiveness. The horizontal axis represents the number of tuning iterations performed by the analog canceler. The plotted line 502 illustrates a traditional analog canceler that does not use a neural network to generate tuning coefficients. As shown, it reaches a cancelation of 30 decibels between 30 and 40 tuning iterations, for this example scenario. The plotted line 504 illustrates tuning of an analog canceler that uses a neural network 112 to generate coefficients for the analog canceler 106. In this case, the neural network was trained with 100 samples of training data. As shown, fewer tuning iterations—in this case about 25—are required to achieve 30 decibels of cancellation. The Plotted lines 506 and 508 represent tuning of an analog canceler using a neural network trained with 625 samples and 2500 samples, respectively. In each case, not only does the analog canceler achieve 30 decibels of cancelation with fewer iterations, but the analog canceler also provides 10 decibels of cancelation prior to the first tuning iteration. The plots shown in graph 500 are based on experimental data for specific embodiments. One skilled in the art will recognize that other results may be achieved with other embodiments of the invention.

Process Overview

Figure 6:
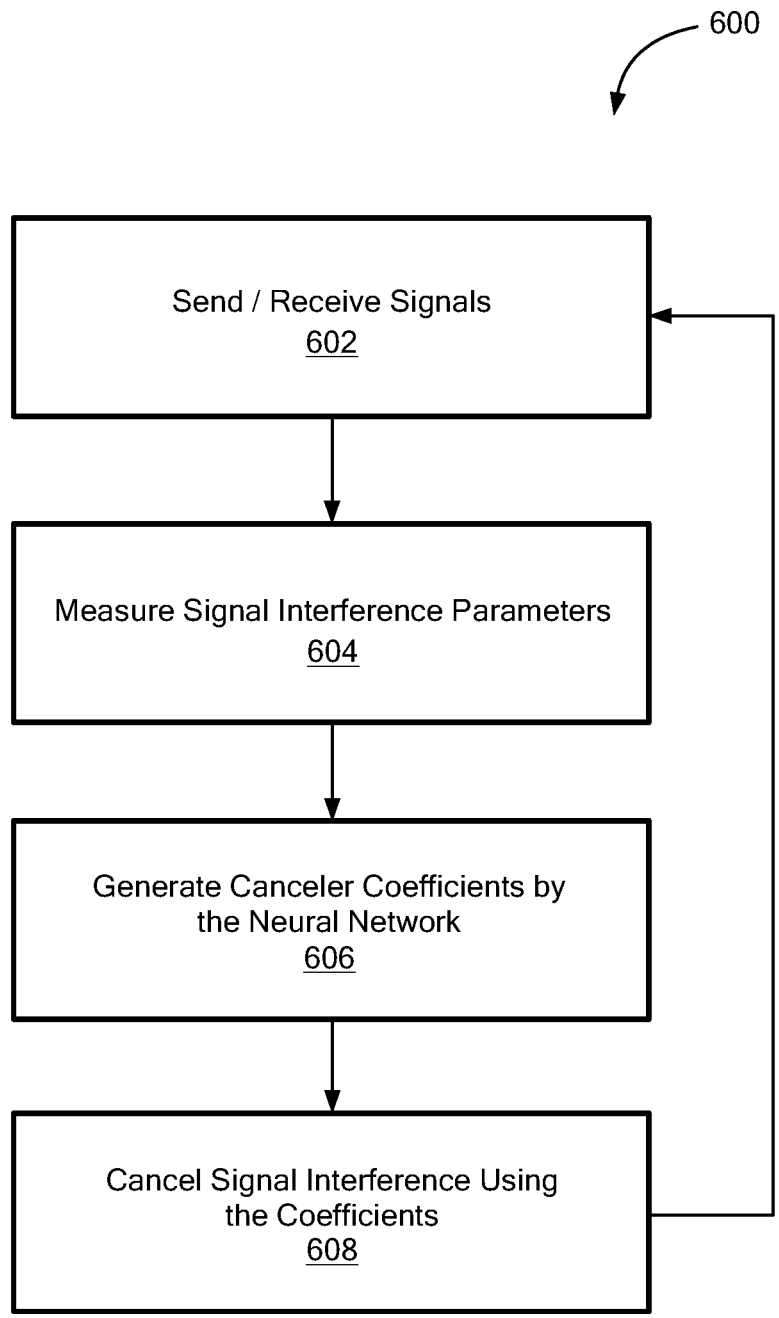
FIG. 6 is a flowchart of a process for canceling signal interference.

Referring to FIG. 6, a process 600 for providing analog cancelation may be implemented by, for example, a device such as mobile device 104, or any other device incorporating a neural network configured to provide coefficients to an analog canceler. In box 602, signals are sent and received over an antenna system 114. The signals may be sent and received at the same time in a same frequency band, for example in an IBFD system, causing signal interference to occur.

In box 604, an input parameter generator 204 or other measurement circuit measures characteristics of the signal interference, as described above. The measurements are provided to the neural network 112 as input parameters P. In embodiments, some or all of the measurements are taken from a received signal path and/or a transmission signal path of the device.

In box 606, the neural network 114 generates coefficients for the analog canceler 106 based on the input parameters P representing the signal interference. The coefficients are cancelation weights, delay times, or other parameters that direct the canceler to generate an output signal that cancels the signal interference, as described above.

In box 608, the coefficients are applied to the taps of the analog canceler 106 and the analog canceler 106 generates a cancelation signal. The cancelation signal may be combined (e.g. mixed) with the signal on the receiver line 120 to cancel signal interference on the line.

Neural Network Training

Figure 7:
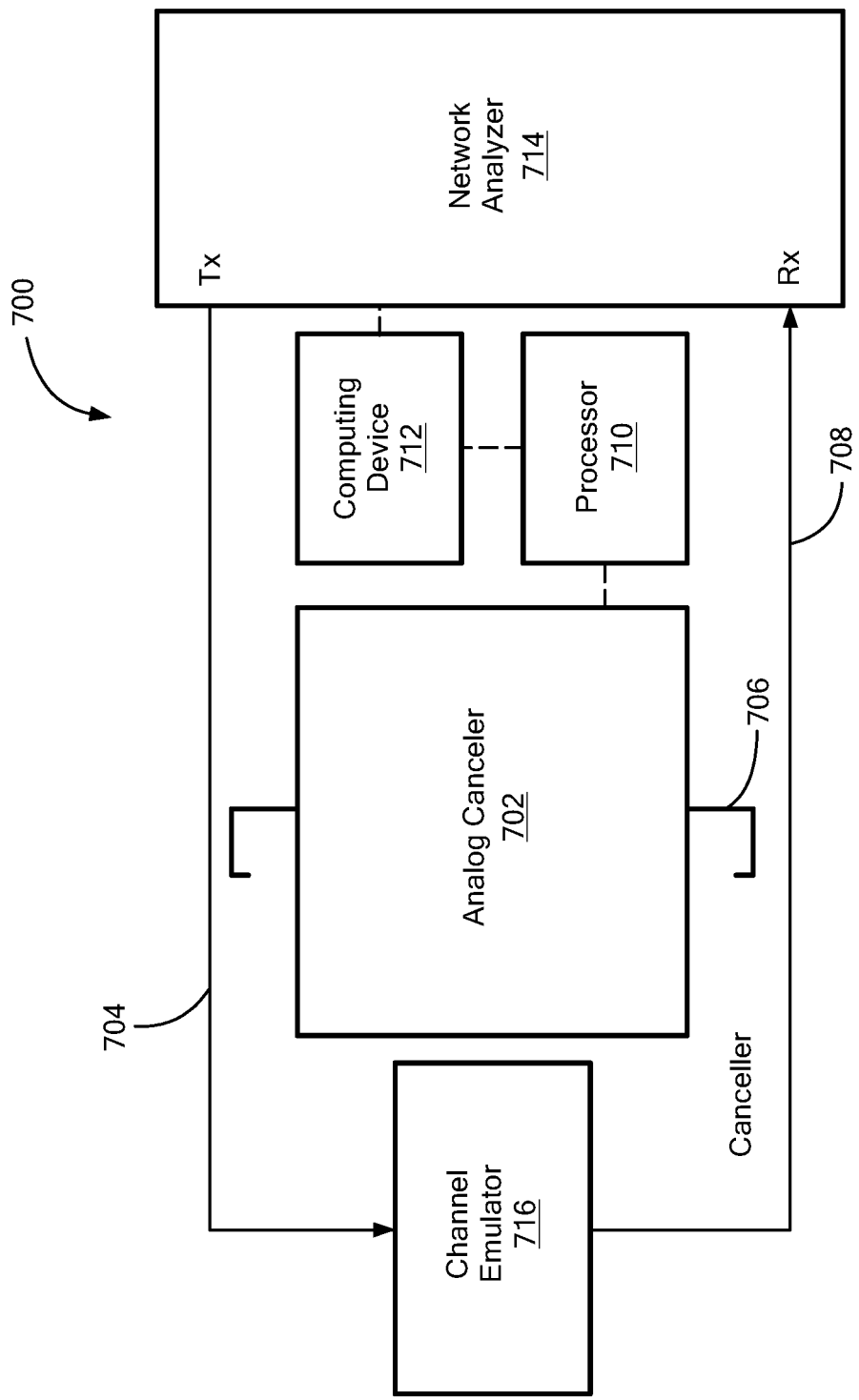
FIG. 7 is a block diagram of a network for generating training data for a neural network.

Referring to FIG. 7, a test network 700 may be used to generate training data for the neural network 112. Test network 700 may include an analog canceler 702, which may be the same as or similar to analog canceler 106. Analog canceler 702 may be coupled to receive data from transmission line 704 and generate a signal interference cancelation signal 706 that can be coupled or mixed onto receiver line 708.

The test network 700 may also include a processor 710 to buffer coefficients for the analog canceler 702. The processor 710 may be an FPGA or other programmable hardware device. A computing device 712 may be coupled to the processor 710 and a network analyzer 714 to generate the coefficients. The computing device can be any programmable computer including a laptop, desktop, microprocessor board, and the like. Although a network analyzer is shown in the figure, a real transceiver may be used when generating the training data.

In embodiments, a channel emulator 716 is used to generate the signal interference and can be used to simulate both direct and multipath signal interference for generating the training data. For example, the channel emulator 716 can be set up to emulate a base station 102 and a strong reflection at some distance away from the base station 102 and/or the mobile device 104.

In other embodiments, the channel emulator 716 can be replaced by an antenna system the same as or similar to antenna system 114. Data can then be generated by using the antenna system in real-world scenarios such as on a city street, in a park, or other in-situ locations.

As the network emulator 716 and analog canceler 702 operate, training data for nodes within the neural network 112 are generated so that the nodes within the neural network 112 can be populated prior to operation of the mobile device 104. To generate the training data the channel emulator can be used to cover the complete range of expected signal interference magnitude and phase for a coupling channel with both direct and multipath signals present. Analog canceler tuning weights can be calculated at various sample points across the magnitude and phase ranges using traditional tuning algorithms. When the tuning algorithm finds the tuning weights for a particular magnitude and phase of the signal interference, the weights can be paired with the corresponding signal interference magnitude and phase. These pairs can then be used to train the neural network 112.

Additionally, or alternatively, a training error e can be computed:

$$e_{s,r} = d_{s,r} - o_{s,r} \quad (3)$$

where d is the desired output vector and o is the actual output vector. These errors can be combined to provide a sum square error E that can be used to evaluate the network training for all sequences and outputs:

$$E(p, v) = \frac{1}{2}\sum_{s=1}^{S}\sum_{r=1}^{S} e_{s,r}^2 = \frac{1}{2} e^T e \quad (4)$$

where v represents a vector containing all the network weights and e is an error vector with the form:

$$e = [e_{1,1}, e_{1,2} \ldots e_{1,R}, \ldots e_{S,1} e_{S,2} \ldots e_{S,R}]^T \quad (5)$$

were $(.)^T$ is the transpose operator.

These training errors and the resulting composite vector (5) can be utilized within a Levenberg-Marquardt back-propagation algorithm to calculate off of the node weights to be used for training the neural network according to:

$$v_{k+1} = v_k - (J_k^T J_k + \mu I)^{-1} J_k^T e_k \quad (6)$$

where v is again a vector containing all the network weights, μ is a scalable learning rate, I is the identity matrix, k is the algorithm iteration number, and J is a Jacobian matrix that contains first-order partial derivatives of the network errors.

Figure 8:
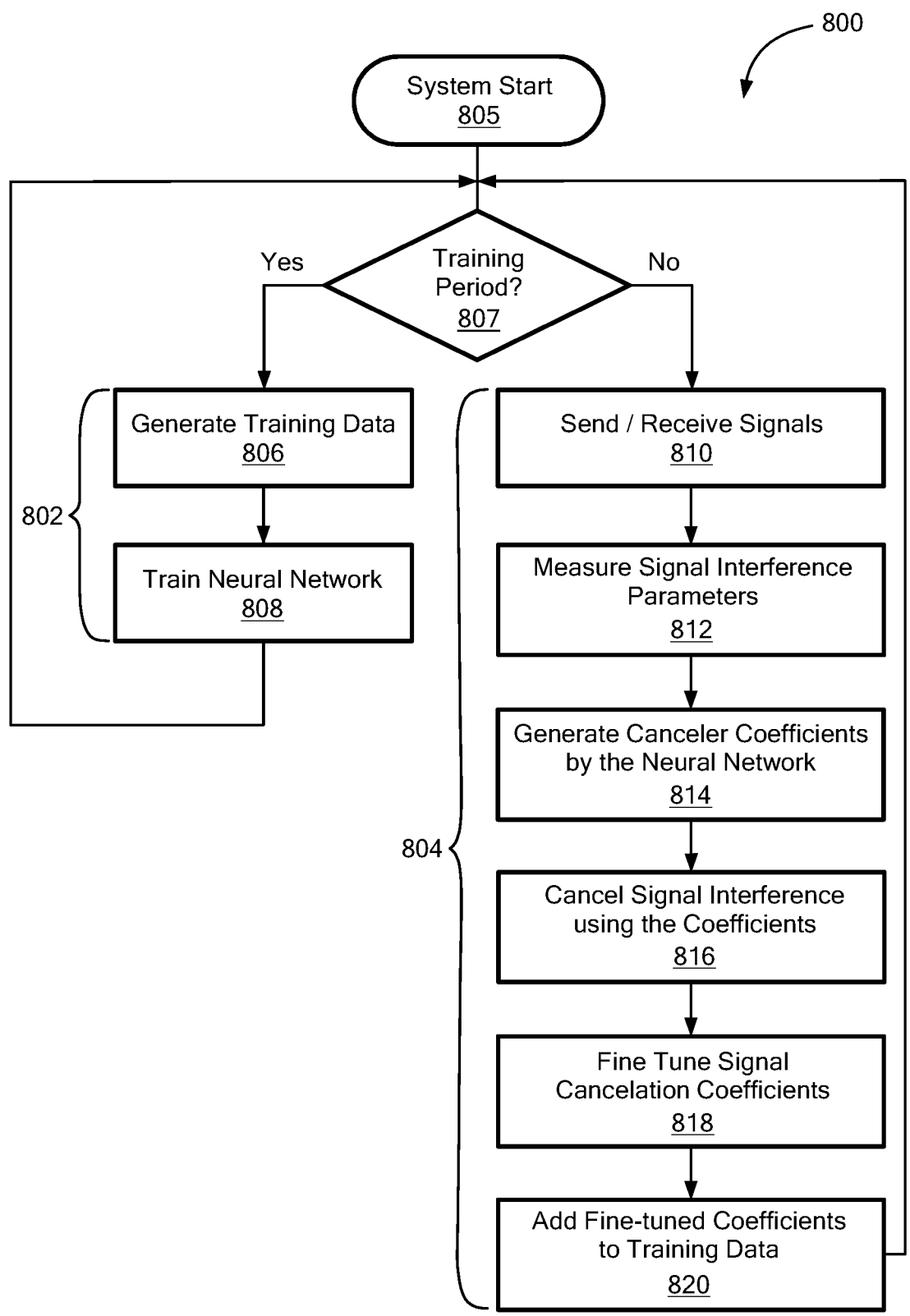
FIG. 8 is a block diagram of a process for canceling signal interference, including a neural network training sequence.

Referring to FIG. 8, a process 800 for training the neural network 112 and using the neural network 112 to cancel signal interference includes a neural network training section 802 and a signal interference cancelation section 804. The system starts in block 805 then determines in block 807 whether the system is in a training period in which the neural network 112 is trained. If so, then in block 806, training data is generated through, for example, the process described above in relation to FIG. 7. In block 808, the training data is loaded into the neural network 112 and the neural network 112 is trained with the initial data.

If the system is not in a training period, then in box 810, signals are sent and received over an antenna system 114. The signals may be sent and received at the same time in a same frequency band, for example in an IBFD system, causing signal interference to occur.

In box 812, an input parameter generator 204 or other measurement circuit measures characteristics of the signal interference, as described above. The measurements are provided to the neural network 112 as input parameters P. In embodiments, some or all of the measurements are taken from a received signal path and/or a transmission signal path of the device.

In box 814, the neural network 114 generates coefficients for the analog canceler 106 based on the input parameters P representing the signal interference. The coefficients are cancelation weights, delay times, or other parameters that direct the canceler to generate an output signal that cancels the signal interference, as described above.

In box 816, the coefficients are applied to the taps of the analog canceler 106 and the analog canceler 106 generates a cancelation signal. The cancelation signal may be combined (e.g. mixed) with the signal on the receiver line 120 to cancel signal interference on the line. Then, in box 818, the system fine-tunes the analog canceler coefficients and, in box 820, adds the fine-tuned coefficients to the training data to further train and fine tune the neural network 112. To perform the fine-tuning, the processor 101 may perform an adaptive algorithm, such as a fast gradient descent algorithm or similar, on the coefficients received from the neural network 112 to fine-tune the coefficients based on performance of the analog cancelation.

During operation, the system may iterate over this process 800 to continually train and improve the operation of the neural network 112 by continuously or periodically supplying it with fine-tuned training data.

Various embodiments are described in this patent. However, the scope of the patent should not be limited to the described embodiments, but rather should be limited only by the spirit and scope of the following claims. All references cited in this patent are incorporated by reference in their entirety.

The invention claimed is:

1. A system comprising:
   a transceiver configured to concurrently transmit signals and receive signals within a single frequency band resulting in signal interference (SI);
   an analog canceler configured to mitigate the SI between the transmitted signals and the received signals; and
   a neural network configured to generate a series of coefficients for use by the analog canceler, the neural network comprising:
   an input to receive data representing one or more parameters that describe one or more characteristics of the SI; and
   an output comprising a series of coefficients which, when applied to the analog canceler, enables the analog canceler to cancel the signal interference between the signals transmitted and received by the antenna system.

2. The system of claim 1 wherein the transceiver comprises an antenna system.

3. The system of claim 2 wherein the antenna system is configured to transmit and receive the signals on a fifth generation (5G) or sixth generation (6G) network.

4. The system of claim 1 wherein the one or more characteristics includes one or more of: a magnitude of the SI, a phase of the SI, a real portion of the SI, an imaginary portion of the SI, a quadrature signal of the SI, a bandwidth of the SI, an error vector of the SI, a frequency of the SI, an average of a signal measurement of the SI over a specific bandwidth of the SI, or a combination thereof.

5. The system of claim 1 wherein the system is an in-band full-duplex system.

6. The system of claim 5 further comprising a mobile device or base station that includes the transceiver, analog canceler, and neural network.

7. The system of claim 1 where the analog canceler has a plurality of taps and the series of coefficients comprises a weighting vector for each tap.

8. The system of claim 1 wherein the neural network is trained with measured data representing signal interference.

9. The system of claim 8 wherein the measured data is generated by measuring signal interference in a second system configured to concurrently transmit signals and receive signals within a single frequency band.

10. A method for communicating on a network, the method comprising:
  concurrently transmitting and receiving, via an transceiver, signals within a single frequency band resulting in signal interference (SI);
  receiving, by a neural network, data representing one or more parameters that describe one or more characteristics of the SI;
  generating, by the neural network, an output comprising a series of coefficients configured to cancel the signal interference;
  providing the series of coefficients to an analog canceler; and
  using the series of coefficients from the neural network, by the analog canceler, to cancel the signal interference.

11. The method of claim 10 wherein the one or more characteristics includes one or more of: a magnitude of the SI, a phase of the SI, a real portion of the SI, an imaginary portion of the SI, a quadrature signal of the SI, a bandwidth of the SI, a frequency of the SI, an error vector of the SI, an average of a signal measurement of the SI over a specific bandwidth of the SI, or a combination thereof.

12. The method of claim 10 wherein using the series of coefficients comprises generating, by the analog canceler, a canceling signal based on the series of coefficients which, when mixed with the signals received by the transceiver, reduces or eliminates the signal interference.

13. The method of claim 12 further comprising mixing the canceling signal with the signals received by the transceiver to reduce or eliminate the signal interference.

14. The method of claim 10 wherein the transceiver, analog canceler, and neural network are parts of a mobile device.

15. The method of claim 10 wherein concurrently transmitting and receiving the signal comprises transmitting and receiving the signals on a fifth generation (5G) or sixth generation (6G) network.

16. The method of claim 10 where the analog canceler has a plurality of taps and the series of coefficients comprises a weighting vector for each tap.

17. The method of claim 10 further comprising training the neural network with training data representing signal interference.

18. The method of claim 17 further comprising generating the training data by measuring the signal interference in a second network.

19. A method for communicating on a network, the method comprising:
  generating signal interference (SI) by transmitting and receiving signals within a single frequency band in a first network;
  generating training data by measuring one or more characteristics of the signal interference;
  training a neural network with the training data;
  communicating on a second network by transmitting and receiving signals within a single frequency band in the second network;
  generating, by the neural network, one or more coefficients for an analog canceler based on the training data and the signals transmitted and received in the second network; and
  using, by an analog canceler, the one or more coefficients to cancel signal interference in the second network.

20. The method of claim 19 wherein the first network is a test network.

21. The method of claim 19 wherein the first and second networks are the same network.

22. The method of claim 19 wherein the first network is a real-world network.

23. The method of claim 19 further comprising generating the signal interference in one or more real-world environments.

24. The method of claim 19 wherein the one or more characteristics includes one or more of: a magnitude of the SI, a phase of the SI, a real portion of the SI, an imaginary portion of the SI, a quadrature signal of the SI, a bandwidth of the SI, an error vector of the SI, a frequency of the SI, an average of a signal measurement of the SI over a specific bandwidth of the SI, or a combination thereof.

* * * * *